United States Patent [19]

Quiros et al.

[11] Patent Number: 5,118,629
[45] Date of Patent: Jun. 2, 1992

[54] VAPOR EXTRACTION TECHNIQUE

[75] Inventors: Jose M. Quiros; Trueman W. Hiller, both of Irvine, Calif.

[73] Assignee: Alton Geoscience, Irvine, Calif.

[21] Appl. No.: 225,488

[22] Filed: Jul. 28, 1988

[51] Int. Cl.⁵ ............................................. G01N 35/08
[52] U.S. Cl. .......................................... 436/55; 422/62
[58] Field of Search ............................. 422/62; 436/55

[56] References Cited

U.S. PATENT DOCUMENTS

| | | | |
|---|---|---|---|
| 2,393,362 | 1/1946 | Gerhold | 422/62 |
| 2,813,138 | 11/1957 | MacQueen | 422/62 |
| 3,057,693 | 10/1962 | Barnes et al. | 422/62 |
| 3,281,214 | 10/1966 | Stein | 422/62 |
| 3,454,365 | 7/1969 | Lumpkin et al. | 422/62 |
| 3,858,397 | 1/1975 | Jacoby | 423/DIG. 6 |
| 3,883,445 | 5/1975 | Roth et al. | 423/213.2 |
| 3,933,135 | 1/1976 | Zillman et al. | 123/494 |
| 4,032,285 | 6/1977 | Rohr et al. | 431/12 |
| 4,109,461 | 8/1978 | Fujitani et al. | 60/274 |
| 4,183,407 | 1/1980 | Knopik | 166/370 |
| 4,323,122 | 4/1982 | Knopik | 166/267 |
| 4,325,921 | 4/1982 | Aiken et al. | 423/210 |
| 4,436,504 | 3/1984 | Kommm | 431/15 |
| 4,593,760 | 6/1986 | Visser et al. | 166/267 |
| 4,625,801 | 12/1986 | McLaughlin et al. | 166/257 |
| 4,729,220 | 3/1988 | Terasaka et al. | 60/277 |

FOREIGN PATENT DOCUMENTS 0969698 10/1982 U.S.S.R. .............................. 422/62

OTHER PUBLICATIONS

Venting For Removal of Hydrocarbon Vapors From Gasoline Contaminated Soil, Thornton & Wootan, J. Environ. Sci. Health, A17(1), 31-44 (1982).
Vacuum: Defense System for Ground Water VOC Contamination, Agrelot, Malot, Visser.

Primary Examiner—Virginia Manoharan
Attorney, Agent, or Firm—Lyon & Lyon

[57] ABSTRACT

A method of removing hydrocarbon contaminants from a source stream, which is particularly applicable to removing volatile hydrocarbon contamination (such as from spilled gasoline) from an underground site. The source stream, which may be extracted from an underground site, is typically mixed with an oxygen containing second stream (preferably air) and the resulting mixed stream passed through a catalytic converter. One or more parameters are monitored which provide an indication of oxidation efficiency by the converter, and the flowrate of one (or both) the source and second streams adjusted so as to maintain efficient operation of the catalytic converter as the hydrocarbon concentration of the source stream changes. The monitoring and adjusting can be manual, or automatic.

7 Claims, 3 Drawing Sheets

VAPOR EXTRACTION TECHNIQUE

FIELD OF THE INVENTION

This invention relates to an apparatus and method for removing hydrocarbon contaminants from a gaseous source stream, and more particularly to removing volatile hydrocarbon contamination from an underground site by extracting a hydrocarbon containing gaseous source stream therefrom and removing hydrocarbon contamination from that source stream.

TECHNOLOGY REVIEW

Contamination of underground strata by volatile hydrocarbons (such as gasoline), in particular the so-called "vadose zone" which lies between the earth's surface and the underground water table, poses a serious environmental problem. The volatile hydrocarbons may pass into the underground water table, rendering it unfit for use. Further, volatile hydrocarbons may percolate upwardly through the soil, into buildings and the like, creating a potential explosion hazard. A particularly common source of volatile hydrocarbon contamination, is leaking underground pipelines, such as those found in automobile service stations, which convey the liquid volatile hydrocarbon from a storage tank to a point of delivery. However, the storage tanks themselves (which can be above or below ground), or even above-ground pipelines, may leak and act as a source of such contamination.

A classical technique of removing contaminants from the vadose zone, is to physically remove and dispose of contaminated sub-surface soil by excavation. Such a technique is relatively expensive, is applicable to only localized spills of volatile liquids due to extensive disruption of the earth's surface, and in the case of a volatile liquid, often only recovers a small portion of the contaminant. Techniques have previously been used or disclosed, for removing sub-surface volatile liquid contaminants, which do not suffer from some or all of the foregoing disadvantages. For example, one technique of removing liquid hydrocarbon contaminants situated on an underground water table requires forming a "cone of depression", by pumping water from the water table at a rate which will cause liquid hydrocarbons to collect in the resulting cone of depression so that they then can be more readily pumped from adjacent the water table. Such a technique is discussed in various sources, for example in U.S. Pat. No. 4,625,801 to McLaughlin et al. However, this technique involves pumping large amounts of water in order to recover a small portion of liquid hydrocarbon contaminant, and further will not collect that portion of a volatile hydrocarbon contaminant which may have vaporized and remains in the subsurface strata.

An alternate technique for removing a layer of a contaminant liquid from a sub-surface strata, such as on the surface of a water table, is disclosed in U.S. Pat. No. 4,323,122 to Knopik. This technique uses a vacuum applied to a vertical pipe extending down a well, so that a lower inlet end of the pipe is positioned in the accumulated layer. The liquid is collected within a tank, and gaseous organic vapors exhausted into the atmosphere, "preferably" after first passing through a cold trap. However, this technique is only applicable where a sufficiently thick layer of the liquid contaminant is present, and further leaves vaporized contaminant in the sub-surface strata. In addition, expelling the organic vapors, such as gasoline vapors directly into the atmosphere, creates air pollution problems which are unacceptable in many areas. Alternatively using a cold trap to condense such vapors may often be impractical due to the necessity of providing sufficient cooling liquid and frequently draining the cold trap.

U.S. Pat. No. 4,183,407 to Knopik does disclose a technique for removing contaminant vapors, such as gasoline vapors, from underground strata. In this method, a vacuum is applied to a vertical pipe sealed in the ground, and which communicates at its lower end with perforated elements. The patent indicates that the contaminant vapor is drawn through the conduit to be collected in an unspecified "suitable collecting device", or expelled into the atmosphere. Again, expulsion into the atmosphere creates an unacceptable pollution hazard in many areas.

Techniques similar to that described in the Knopik '407 patent, has also been described elsewhere. Such arrangements broadly provide for extraction of vapors of volatile liquid contaminants, such as gasoline, from underground strata by applying a vacuum to a pipe extending into a well. For example, Thornton, et al. *J. Environ. Sci. Health*, A17 (1), 31-44 (1982) describe such a technique performed in a facility designed to simulate soil strata, wherein recovered vapors are vented to the atmosphere. Thornton, et al. suggests that alternatively a catalytic oxidizer may be developed as an alternative to exhausting hydrocarbon contaminants to the atmosphere. In fact, it is now known to use catalytic oxidizers for such a purpose. A similar vacuum extraction technique has been applied to recover carbon tetrachloride from sub-surface strata, as a result of a spill occurring in the summer of 1982. The recovered carbon tetrachloride was condensed from the vapor phase by a water condenser. The foregoing technique is described in an article entitled "Vacuum: Defense System for Groundwater VOC Contamination" by Herelot et al., presented at the Fifth National Symposium of Aquifer Restoration and Groundwater Monitoring, May 21-24, 1985, Columbus, Ohio, USA. The foregoing technique is also described in U.S. Pat. No. 4,593,760 to Visser and Malot.

The use of catalysts in various combustion processes is also known. For example, U.S. Pat. No. 3,497,328 to Calvert discloses treating contaminated gases with a solid, such as a catalyst, in a system where a portion of the solid is regenerated and recycled. U.S. Pat. No. 4,325,921 to Aiken et al shows a waste gas purification system which may use a catalytic converter. A detector is provided to sense harmful conditions such as impurities, or high temperature or pressure. If such harmful conditions exist then a valve is opened to allow the waste gases to bypass the purification system, and vent to the atmosphere. U.S. Pat. No. 4,032,258 to Rohr et al describes a method for controlling the air ratio of a combustion process. A portion of the main exhaust gas is extracted and auxiliary gas added thereto, or a gas removed therefrom by means such as a catalyst, to adjust the gas content of that portion within maximum sensitivity of a sensor. The sensor output then controls air and/or fuel supply. U.S. Pat. No. 4,436,504 to Komm describes an apparatus which monitors a condition, such as temperature, in an exhaust gas stream, and provides a warning signal when the sensed condition exceeds a predetermined value.

Hence, although the concept of vacuum extraction of volatile hydrocarbon contaminants from sub-surface strata is known, the recovered hydrocarbons have either been directly vented to the atmosphere, or passed through a catalytic converter to oxidize at least some of them prior to venting the recovered gaseous to the atmosphere. In situations where a catalytic converter has been used, a difficulty affecting their operation is the fact that for the period of an extraction operation, which may be typically be several months, the hydrocarbon/oxygen ratio in the extracted source stream decreases. Initially, depending upon the particular recovery well and apparatus used, the foregoing ratio may either be too high, or in fact may be suitable for sustaining operation of the catalytic converter. In this regard, it should be noted that most catalytic converters do not operate at all, or operate relatively inefficiently, below a critical temperature. Thus, even if the hydrocarbon/oxygen ratio is initially sufficient for catalytic oxidation, as extraction from the contaminated sub-surface strata continues, the foregoing ratio will decrease with a resulting decrease in catalytic converter temperature and oxidation efficiency. This results in an increased amount of non-oxidized hydrocarbons being vented to the atmosphere, and contributing to air pollution.

SUMMARY OF THE INVENTION

The present invention then provides a method and apparatus which broadly is useful to remove hydrocarbon contaminants from a gaseous source stream. The present invention is particularly adapted for removing hydrocarbon contamination from an underground site, by extracting the source stream from the underground site by means of a blower or the like.

In the method, the source stream is preferably mixed with an oxygen containing second stream, and the resulting mixed stream passed through a catalytic converter which can oxidize hydrocarbons in the presence of oxygen (typically to water vapor and carbon dioxide). A parameter is measured which can provide an indication of a change in uncorrected hydrocarbon oxidation efficiency by the catalytic converter. The flowrate of either, or both, of the source stream and an oxygen containing second stream (which is preferably an air stream), is adjusted when a decrease in uncorrected oxidation efficiency is indicated. The adjustment is performed so as to reduce the indicated decrease.

By a change in uncorrected hydrocarbon oxidation efficiency, is meant a change in the proportion of hydrocarbons which would be oxidized by the converter, provided no measures were taken to offset that change, other than changing the first, second, or mixed stream flowrates. In the preferred version of the method, the gases enter a preheater and are preheated a greater amount when the source stream hydrocarbon concentration decreases, so that this also compensates somewhat for the decreased oxidation efficiency which would otherwise occur. A change in the uncorrected hydrocarbon oxidation efficiency then, would in this case be the change in oxidation efficiency which would occur absent any correction introduced by operation of the preheater.

The foregoing method is preferably adapted to remove hydrocarbon contamination from an underground site. In such adaptation, a gaseous source stream containing hydrocarbon vapor is extracted from the underground site, preferably by means of a pump, the inlet end of which is connected to a vertical conduit extending into a contaminated subterranean formation. The pump may be any of any type which can generate a sufficient inlet vacuum, but is preferably a non-positive displacement centrifugal type pump (i.e. a "blower").

Various parameter or parameters, can be measured to provide an indication of a change in uncorrected hydrocarbon oxidation efficiency by the catalytic converter. Preferably, the parameters include the hydrocarbon concentration of the mixed stream, further preferably in combination with the hydrocarbon concentration in the exhaust from the catalytic converter. Alternatively, a temperature downstream from an inlet of the catalytic converter (preferably the converter temperature itself) could be used. However, other parameters can also be used. For example, the hydrocarbon concentration of the exhaust from the catalytic converter can also be measured, and used in conjunction with the source stream hydrocarbon concentration, to control the second stream flowrate. Further, these latter parameters can also be used in conjunction with the catalytic converter exhaust temperature. It will be appreciated that a number of the foregoing can be measured, to provide an indication of uncorrected hydrocarbon oxidation efficiency by the catalytic converter.

The flowrates of the source and second streams, are readily adjusted by valves. When the hydrocarbon concentration of a stream passed to the catalytic converter is used as the parameter for providing an indication of a change in uncorrected hydrocarbon oxidation efficiency, then as the measured hydrocarbon concentration decreases the second stream flowrate would also normally be decreased. Thus, in the operation of the method for removing hydrocarbon contamination from an underground site, the hydrocarbon concentration in the extracted source stream is expected to decrease over time, thereby indicating that the oxygen flowrate should also be decreased. However, it should be understood that the use of the word "normally" in the foregoing circumstance allows for overriding unusual situations. For example, if an apparatus performing the method has reached a temperature limit predetermined as the maximum operating temperature for the apparatus, the second stream flowrate may actually be increased regardless of measured hydrocarbon concentration, in an effort to reduce the apparatus temperature.

An apparatus suitable for performing the foregoing method, is also provided.

BRIEF DESCRIPTION OF THE DRAWINGS

Embodiments of the invention will now be described with reference to the drawings in which.

DETAILED DESCRIPTION OF THE EMBODIMENTS OF THE INVENTION

Figure 1:
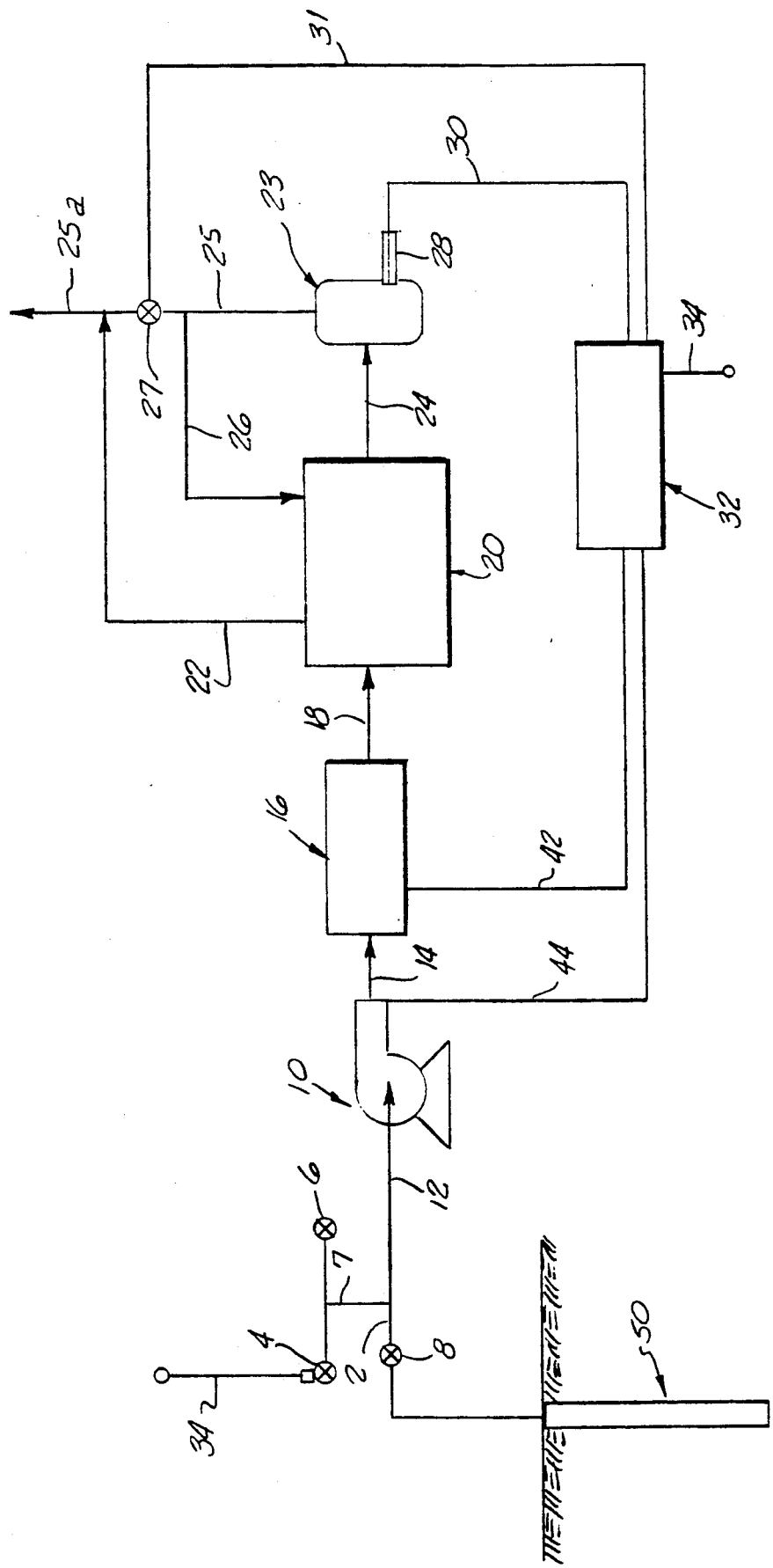
FIG. 1 is a schematic view of an apparatus of the present invention.

Referring to FIG. 1, the apparatus shown is designed for removing volatile hydrocarbon contaminants, such as gasoline, from an underground site. In particular, the apparatus shown has a source stream inlet 2 which merges with an air stream inlet 7. Air stream inlet 7 is supplied by air admitted through a manually operable mixing valve 6 and an electrically operated modulating valve 4. Valve 4 is normally closed, but can be opened when energized. Typically, when valve 4 is opened, the flowrate of the air stream admitted through it would be about 10 to 25% of the maximum flowrate admitted through valve 8. Source stream inlet 2 can receive a source stream admitted through manually operable valve 8. Inlets 2 and 7 both communicate with an inlet 12 of a blower 10. Blower 10 is preferably a non-positive displacement type blower, with sufficient capacity to simultaneously draw a source stream containing gasoline vapors (as well as air) from a well 50 into source stream inlet 2, and an air stream through inlet 7, and drive the resulting mixed stream through blower 10, line 14, an electric preheater 16, line 18, an optional heat exchanger 20, and line 24.

Catalytic converter 23 is of a well known type of construction, which is capable of oxidizing hydrocarbons in the presence of oxygen, to essentially water vapor and carbon dioxide. Catalytic converters such as converter 23 generally must be maintained at a relatively high temperature in order to have reasonable oxidation efficiency. For example, typically they must be maintained in the range of about 1000° F. to obtain a catalytic oxidation efficiency of greater than 90%. The heat for maintaining converter 23 at the required temperature is generated by the catalytic oxidation itself. However, during startup of the apparatus, electric heater 16 heats the combined source and air streams to a temperature typically of about 600° F., in order to commence efficient catalytic oxidation.

An exhaust outlet 25 of catalytic converter 23 is preferably connected through a line 26 to optional heat exchanger 20, in order to preheat the gaseous stream being delivered to the catalytic converter 23, and from there is vented through line 22 and exhaust stack 25a to the atmosphere. An electrically operable exhaust diverting valve 27 is connected between outlet 25 and stack 25a, which valve is normally closed but can be opened to also direct a portion of exhaust gases from outlet 25 directly to stack 25a thereby decreasing exhaust gas flow through heat exchanger 20. A temperature sensor 28 measures the temperature of catalytic converter 23, for purposes which will become apparent shortly.

A controller 32 is connected to sensor 28 through line 30 and to modulating valve 4 through line 34. Controller 32 is also connected through line 42 to provide a signal to suitable circuitry in heater 16 which allows controller 32 to turn heater 16 on or off. Controller 32 consists of suitable circuitry such that when sensor 28 indicates to controller 32 through line 30, that catalytic converter 23 is below a desired minimum start-up temperature, controller 32 will, during a manual start-up phase (described in more detail below), turn on heater 16 through line 42. Further, during the automatic operation phase (described in more detail below), when a temperature below a desired minimum operating temperature of converter 23 is sensed by sensor 28, controller 32 will turn on electric heater 16. In addition, controller 32 can open valve 4 to increase the flowrate of the air stream (a "second stream") should the temperature sensed by sensor 28, exceed a value predetermined to be the maximum desirable operating temperature for converter 23. Controller 32 can also turn blower 10 on and off, through line 44.

The operation of the apparatus of FIG. 1 will now be described. First, it will be assumed that the source stream inlet 2 has been placed in communication with an extraction well 50, which extends into a subterranean formation contaminated with a volatile hydrocarbon (such as gasoline resulting from a leaky underground pipe). Typically, source stream inlet 2 will be in sealing engagement with the top of well 50 so that air cannot enter from the surface downward through well 50 and the into source stream inlet 2.

Figure 2:
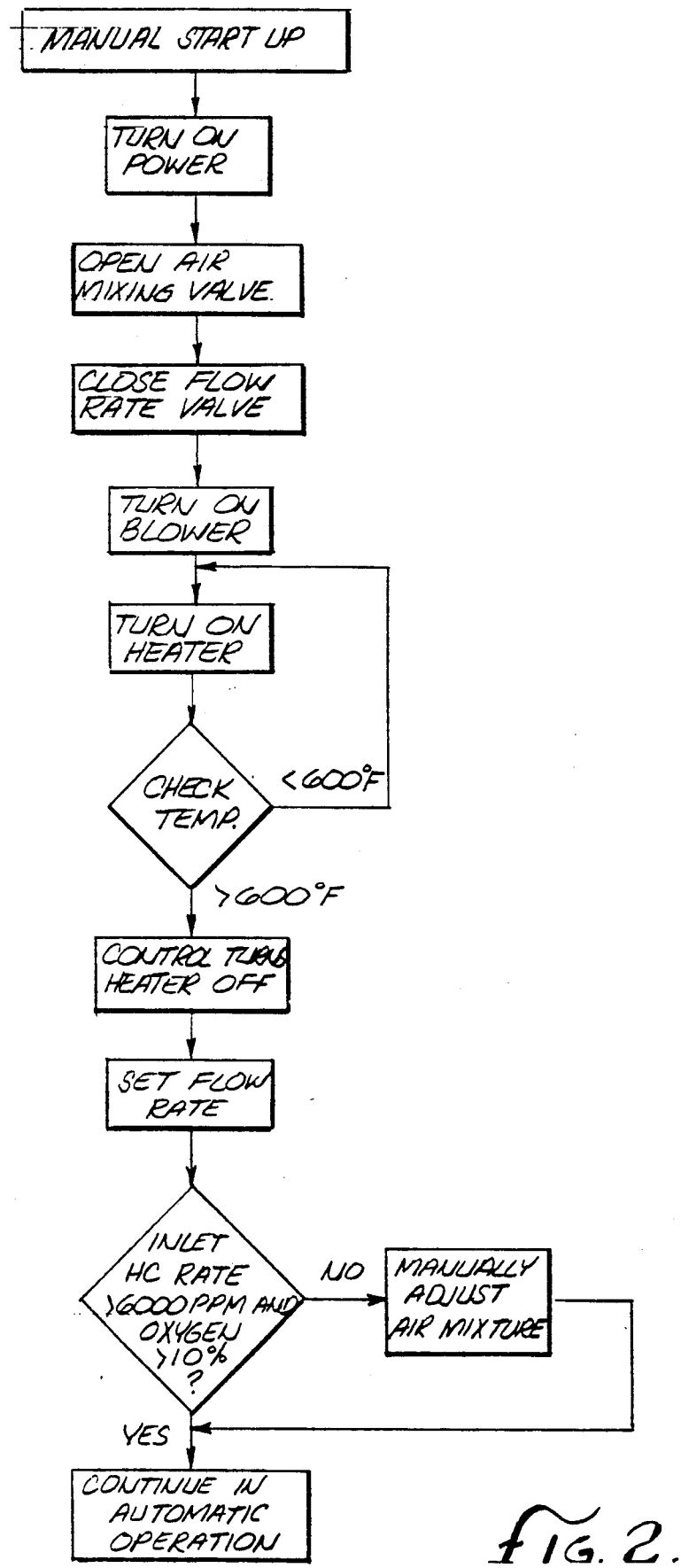
FIG. 2 is a flowchart illustrating initial manual start-up procedure of the apparatus of FIG. 1.
Figure 3:
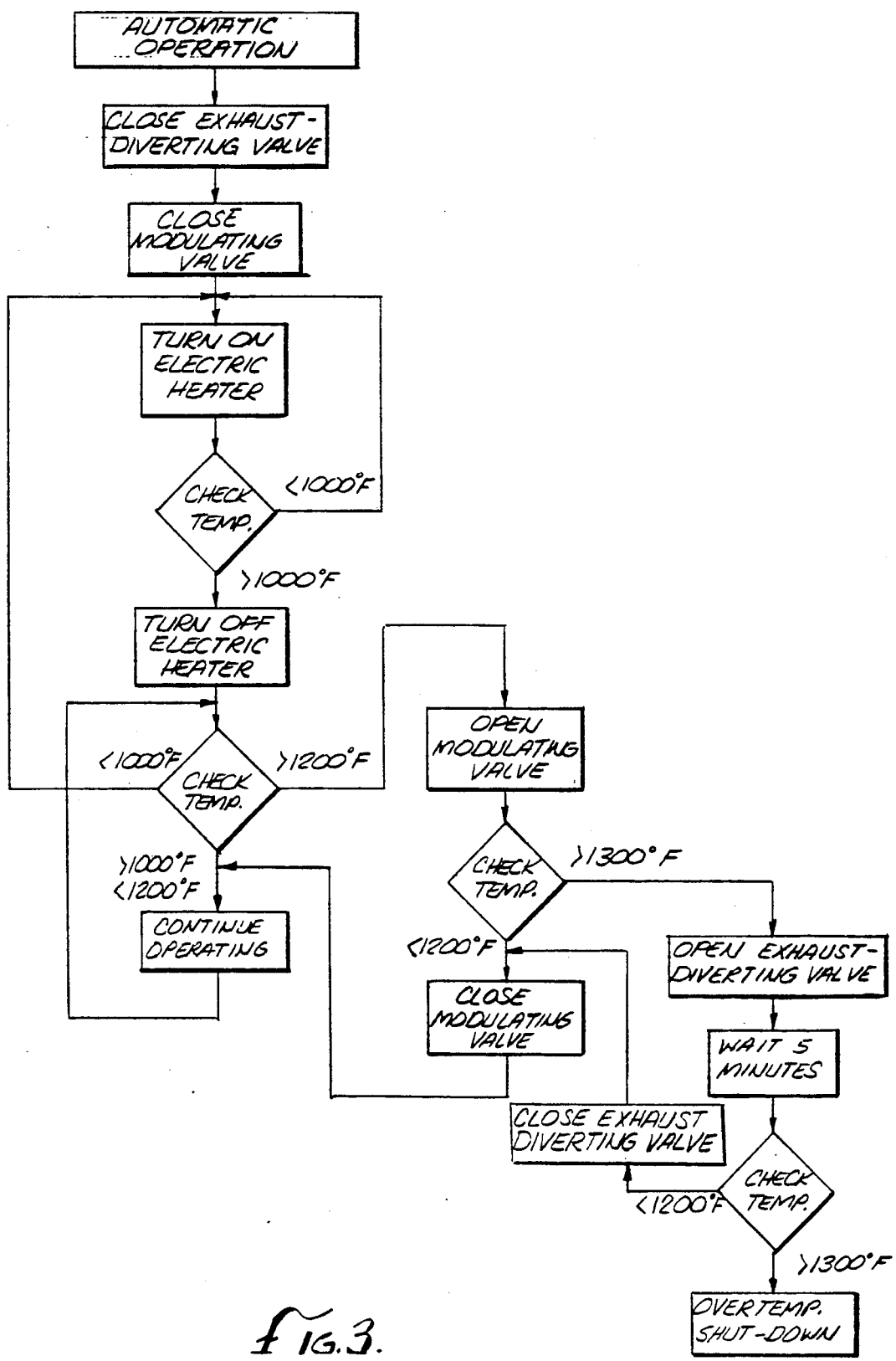
FIG. 3 is a flowchart illustrating automatic operation of the apparatus of FIG. 1, following the manual start-up procedure of FIG. 2.

The flowcharts of FIG. 2 and 3, illustrate operation of the apparatus of FIG. 1. As will be seen from those Figures, operation of the apparatus of FIG. 1 requires both an initial manual startup phase, followed by a semi-automatic operation phase. In the manual startup phase, illustrated by the flowchart of FIG. 2, initially power to the apparatus is manually turned on by an operator, and air mixing valve 6 manually opened while flow rate valve 8 is manually closed. The initial closed position of flow rate valve 8 assures that hydrocarbons will not be drawn in a source stream from well 50, and passed through converter 23 which has not been brought to proper operating temperature (which would result in discharge of high concentrations of hydrocarbons through stack 25a). Blower 10 and heater 16, are then manually turned on and controller automatically turns heater 16 off once it has received a signal through line 30 indicating that coverter 23 has reached its minimum desired start-up temperature (set at 600° F. in the particular example below). Flow rate valve 8 is then adjusted manually by an operator to the desired setting. In many instances, flow rate valve can be left fully open (and indeed, could be omitted from the apparatus). However, in some jurisdictions hydrocarbon emissions are limited by law as a total amount per time period, and valve 8 allows adjustment of the source stream flowrate so that the limit is not exceeded, bearing in mind the expected hydrocarbon concentration in the source stream, and the expected efficiency of converter 23.

The source stream will mix with the air stream as the two enter line 12, to form a mixed stream. A hydrocarbon sensor (not shown) is used by the operator to measure hydrocarbon concentration, after the source and air streams have mixed, for example at line 12. Preferably the operator also measures oxygen concentration and flowrate at line 12. Valves 6 and 8 are then manually adjusted so that the hydrocarbon and oxygen concentrations in the mixed stream, are greater than 6000 parts per million ("ppm") and 10% by volume, respectively. In the case where the hydrocarbon is gasoline, these values represent about 25% of the lower explosive limit ("LEL") of the gasoline, and have been found in practice to produce satisfactory results in recovering gasoline. For other hydrocarbons, suitable hydrocarbon and oxygen concentrations can be determined by performing experimental trials in which both the hydrocarbon and oxygen concentration of the mixed stream, are measured, along with the hydrocarbon concentration of exhaust from converter 23. At this point, the apparatus is then switched to the semiautomatic phase of operation (for example by manually activating a suitable switching circuit on a control panel, not shown).

Referring to FIG. 3, once the apparatus is engaged in the semi-automatic mode, controller 32 closes valve 27 by a suitable signal through line 31. Exhaust gases from converter 23 will then be directed through heat exchanger 20. Controller 32 also signals modulating valve 4 to close, although it should already be in the closed position. As will be seen from FIG. 3, controller 32 continually monitors sensor 28 and turns heater 16 on if sensor 28 indicates that the temperature of converter 23 has fallen below a temperature predetermined to be a minimum required operating temperature for efficient operation of converter 23 (set at 1000° F. in the particular example below). Controller 32 otherwise turns heater 16 off if the temperature of converter 23 is greater than 1000° F. Should sensor 28 indicate a temperature greater than a predetermined maximum operating temperature of converter 23, then controller 23 will open modulating valve 4, in an effort to admit excess air to converter 23 and cool it. When sensor 28 then indicates that the temperature of converter 23 has fallen below a value slightly above the maximum operating temperature (1200° F. in the example below), then controller 32 again closes valve 4. Should sensor 28 indicate a preset converter temperature significantly higher than the maximum operating temperature (set at 1300° F. in the example below), then controller 32 will also open exhaust diverting valve 27 to decrease heat added to the mixed stream entering converter 23, in a further effort to decrease the converter temperature. If this effort has not succeeded after a preset time period, then controller 32 shuts down the entire apparatus. If the effort has succeeded to the point of decreasing converter temperature to a preset value (1200° F. in the example below), then valves 27 and 4 are again closed, and operation of the apparatus continued as before.

The semi-automatic operation phase described above, is only "semi-automatic" since operator intervention is still required in order to reduce an indicated decrease in uncorrected hydrocarbon oxidation efficiency. In particular, where the apparatus is removing volatile hydrocarbon contamination from an underground spill, such as may result from leakage of an underground gasoline line at an automobile service station, it is anticipated that an operator will manually monitor the apparatus approximately once per week. During the monitoring sessions, the hydrocarbon concentration in the mixed stream will be measured as a parameter which can indicate a change in the uncorrected hydrocarbon oxidation efficiency. When the hydrocarbon concentration is found to have decreased, then the air stream flowrate would also normally be decreased by the operator, usually simply by adjusting valve 6, although both valves 6 and 8 could be adjusted as required. The amount of adjustment can be determined from precalibration of the valves for the particular apparatus, prior to its use, so that the same hydrocarbon and oxygen concentrations can be maintained in the mixed stream. Alternatively, the adjustment required can be determined by actually measuring the oxygen concentration in the mixed stream, and adjusting the valves until the measured oxygen concentration is lowered to the value previously determined to produce a good oxidation efficiency with the particular catalytic converter (10% by volume, as mentioned above). If desired, as a check on the adjustment, the hydrocarbon concentration of the exhaust from converter 23, can actually be measured at line 25 during the monitoring sessions.

An apparatus was constructed substantially according to FIG. 1, with a 1.5 horsepower regenerative blower 10, and a single catalyst converter as catalytic converter 23 (although the proposed catalytic converter 23 is an Englehard "Torvex" dual catalyst unit, Model PTX-623D, available from Englehard Corporation, Union, N.J., USA, which the manufacturer's literature indicates should be a more efficient unit). A shell and tube heat exchanger functioned as optional heat exchanger 20, and for electric preheater 16 a 4500 watt two-stage electric heater was used (first stage 3500 watts; second stage 1000 watts). It is anticipated though, that a single stage 4500 watt heater will be used. The source stream inlet 2 of the foregoing apparatus was sealingly connected to the top of a perforated polyvinylchloride ("PVC") well casing, which extended into a subterranean soil formation contaminated with gasoline. The apparatus was additionally provided with a hydrocarbon sensor, disposed to measure the hydrocarbon concentration of exhaust from converter 23, as well as a temperature sensor to measure the temperature of the first stage of preheater 16, and a hydrocarbon concentration sensor to measure the hydrocarbon concentration of the source stream entering source stream inlet 2. Further parameters of operation of the apparatus, and the results of the trial are summerized below in Table 1. In Table 1, the following abbreviations are used: "cfm" (cubic feet per minute); "temp." (temperature); "W.C." (water column); "conc." or "concent." (concentration); "eff" (efficiency of oxidation of hydrocarbons, i.e. % hydrocarbons oxidized; "HC" (hydrocarbon)

| | P across cat. oxidizer & attached heater = 10.85" W.C. 1st Heater = 3500 watts 2nd Heater = 1000 watts | | | | |
|---|---|---|---|---|---|
| | INPUT CONC. TO BLOWER HC (ppm) | OXIDIZER EXHAUST CONCENT. HC (ppM) | EXHAUST TEMP. °F. | TIME | EFF (%) |
| Hydrocarbon measured as HEXANE | | | | | |
| 1st Heater ON; total intake of Blower = 25 CFM | | | | | |
| Vapor only ON (Conc. from | | | 288 | 11:20 | |
| extraction | | | 337 | 11:27 | |
| well = 9000 ppm) | | | | | |
| Added 2nd Heater (1000 watts) | | | 348 | 11:33 | |
| 1st Heater outlet temp. = | 9000 | 8560 | 380 | 11:44 | |
| 483° F. | | 8080 | 400 | :50 | |
| | | 7730 | 452 | :55 | |
| | | 7650 | 541 | 12:00 | |
| | 9100 | 7770 | 731 | :15 | 14.6% |
| Induce air into vapors, | | 6500 | 738 | :17 | 28.6% |

-continued

P across cat. oxidizer & attached heater = 10.85" W.C.
1st Heater = 3500 watts
2nd Heater = 1000 watts

| | INPUT CONC. TO BLOWER HC (ppm) | OXIDIZER EXHAUST CONCENT. HC (ppM) | EXHAUST TEMP. °F. | TIME | EFF (%) |
|---|---|---|---|---|---|
| opening | | 6260 | 762 | :20 | 31.2% |
| modulating valve. | | 5640 | 794 | :27 | 38.0% |
| | | 5050 | 819 | :30 | 44.5% |
| | | 4420 | 861 | :34 | 51.4% |
| Complete close Modulating Valve: | | 5850 | 885 | :36 | 35.7% |
| | | 6250 | 907 | :38 | 31.3% |
| | | 7430 | 924 | :45 | 18.4% |
| Induce air into vapors, | | 6030 | 918 | :47 | 33.7% |
| opening | 8660 | 5630 | 917 | :48 | 35.0% |
| modulating valve. | | 4940 | 973 | :55 | 43.0% |
| | | 4910 | 1000 | 1:00 | 43.3% |
| Check HC input. Concentration | 8560 | 4800 | 1002 | :02 | 43.9% |
| to blower. All heaters | 6440 | 1180 | 1014 | :05 | 81.7% |
| OFF. | 6400 | 640 | 1037 | :06 | 90.1% |
| | | 430 | 1069 | :07 | 93.3% |
| | | 290 | 1105 | :08 | 95.5% |
| | 6200 | 280 | 1160 | :10 | 95.5% |
| | | 210 | 1183 | :11 | 96.6% |
| | | 180 | 1200 | :12 | 97.1% |
| Vapor 100% (i.e. no air | | 1480 | 1208 | :13 | |
| stream. source stream from | | 2070 | 1211 | :14 | |
| well only) | | | | | |
| Induce air into vapors | 5300 | 170 | 1218 | :15 | 96.8% |
| | | 50 | 1222 | :16 | 99.1% |
| Lean out vapor concen- | 4020 | 40 | 1290 | :18 | 99.0% |
| tration. Check | 3160 | 40 | 1462 | :20 | 98.7% |
| for min. concentration | 1740 | 70 | 1461 | :21 | 96.0% |
| to sustain temp. | | 10 | 1450 | :22 | |
| total intake of blower | 920 | 60 | 1434 | :23 | 93.5% |
| increased to 35 CFM | | 0 | 1426 | :24 | |
| | | 0 | 1410 | :25 | |
| | 6600 | | | :31 | |
| | 6600 | 990 | 1260 | | 85.0% |
| | | 1140 | 1277 | | |
| | 5860 | | 1328 | :36 | |
| | 5100 | | 1349 | | |
| | 4300 | | 1378 | | |
| | 4270 | | 1382 | :39 | |
| | | 1270 | 1381 | :40 | |
| | 4080 | 1450 | 1370 | :41 | 64.5% |
| | 4500 | | 1354 | :42 | |
| | 5680 | | 1252 | :45 | |
| | 5720 | | 1190 | :46 | |

Hydrocarbons measured as Hexane with Horiba HC Analyzer Model MEXA-224 GE.

It will be seen then, that using an apparatus of the present invention, it is possible to readily obtain over 90% efficiency in catalytic oxidation of contaminant hydrocarbon recovered from an underground site.

It will be appreciated though, that various modifications could be made to the apparatus. For example, the foregoing manual adjustments described in the semi-automatic phase of operation, could be made automatic by providing suitable sensors (eg. hydrocarbon concentration and oxygen flowrate sensors) linked to controller 32 (which would be provided with suitable circuitry), in turn linked to control valves 6 and 8. Further, other data could be used to provide an indication of changing hydrocarbon concentration in the source stream and used in such an automatic arrangement. For example, a decreasing temperature of converter 32 would, in the case where the apparatus is removing volatile hydrocarbon contamination from an underground site, would normally indicate a decreasing hydrocarbon concentration in the mixed stream, and could be used by a suitably modified controller to signal an electrically controlled air mixing valve to partially close. Another parameter which could be used in addition to hydrocarbon concentration of the mixed stream, would be the hydrocarbon concentration of the catalytic converter exhaust. In addition, during use of the apparatus to remove volatile hydrocarbon contamination from an underground site, the well from which the source stream is extracted, is not required to be provided with a casing, provided it will maintain its integrity (i.e. not collapse) during performance of the method of the present invention.

Various additional modifications and alterations to the particular embodiments described above, are of course possible. Accordingly, the present invention is not limited to only the particular embodiments described.

What is claimed is:

1. A method of removing volatile hydrocarbon contamination from soil of an underground site
    consisting of extracting from soil from an underground site a gaseous source stream containing hydrocarbon vapor, passing the gaseous source stream through a catalytic converter to an outlet so as to oxidize hydrocarbons, and measuring the temperature of the stream downstream of the outlet of the catalyst converter, and (a) mixing an oxygen containing second stream with the source stream prior to passing the gaseous stream through the catalytic converter when the measured temperature exceeds a predetermined maximum operating temperature, and (b) heating the source stream prior to passing the same through the catalytic converter when the measured temperature is below a predetermined temperature.

2. A method as in claim 1 wherein
the flow of the oxygen containing second stream is increased when said measured temperature exceeds the predetermined maximum operating temperature.

3. A method as in claim 2 wherein
at least one of the source stream and the second stream is passed through a preheater which can heat the stream passed therethrough so as to raise the temperature of the catalytic converter.

4. A method as in claim 1 wherein
the second stream is an air stream.

5. A method as in claim 1 wherein
the gaseous source stream is extracted from the soil by installing a well in a contaminated area of soil and the stream containing hydrocarbon vapor is extracted and passed through the catalytic converter.

6. A method for removing volatile hydrocarbon contamination from soil of an underground site
consisting of extracting from the soil of the underground site a gaseous source stream containing hydrocarbon vapor, preheating a catalytic converter which can oxidize hydrocarbons in the presence of oxygen, mixing the source stream with an oxygen containing second stream, passing the resulting mixed stream through the catalytic converter to an outlet so as to oxidize the hydrocarbons, and measuring the temperature of the flow stream downstream of the outlet of the catalytic converter, and (a) increasing the flow of the second stream when the measured temperature exceeds a predetermined temperature of the converter, and (b) heating one of the gaseous stream and the second stream when the measured temperature is below a predetermined operating temperature.

7. A method as in claim 6 wherein
the hydrocarbon concentration of one of the source stream and the mixed stream is measured, and the flow of the second stream is decreased in response to a decrease in the measured hydrocarbon concentration.

* * * * *